US012476462B2

(12) United States Patent
Thyagaturu et al.

(10) Patent No.: US 12,476,462 B2
(45) Date of Patent: Nov. 18, 2025

(54) PLATFORM CONFIGURATION BASED ON AVAILABILITY OF SUSTAINABLE ENERGY

(71) Applicant: Intel Corporation, Santa Clara, CA (US)

(72) Inventors: Akhilesh S. Thyagaturu, Tempe, AZ (US); Saidulu Aldas, San Ramon, CA (US); Vinodh Gopal, Westborough, MA (US); Mohit Kumar Garg, Hisar (IN); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 694 days.

(21) Appl. No.: 17/586,482

(22) Filed: Jan. 27, 2022

(65) Prior Publication Data

US 2022/0149625 A1 May 12, 2022

(51) Int. Cl.
*H02J 3/14* (2006.01)
*H02J 3/00* (2006.01)

(52) U.S. Cl.
CPC .............. *H02J 3/144* (2020.01); *H02J 3/003* (2020.01); *H02J 3/008* (2013.01); *H02J 2300/20* (2020.01)

(58) Field of Classification Search
CPC ....................................................... H02J 3/144
See application file for complete search history.

(56) References Cited

U.S. PATENT DOCUMENTS

| 9,277,497 | B2* | 3/2016 | Ansari | H04W 52/0206 |
| 2010/0211233 | A1* | 8/2010 | Roscoe | H02J 3/14 |
| | | | | 700/295 |
| 2012/0091799 | A1* | 4/2012 | Rofougaran | H02J 50/20 |
| | | | | 307/29 |
| 2017/0321912 | A1* | 11/2017 | Ansted | F28D 20/028 |
| 2019/0339030 | A1* | 11/2019 | Belady | H01M 8/04291 |
| 2020/0076477 | A1* | 3/2020 | Tramoni | H02M 7/06 |

FOREIGN PATENT DOCUMENTS

| CN | 109800924 A | * | 5/2019 |
| JP | 2009530709 A | * | 8/2009 |

OTHER PUBLICATIONS

Barrios-O'Neill, Danielle, and Geertje Schuitema. "Online engagement for sustainable energy projects: A systematic review and framework for integration." Renewable and Sustainable Energy Reviews 54 (2016): 1611-1621, 39 pages.
Kreith, Frank, and Susan Krumdieck., "Principles of sustainable energy systems", Elsevier. CRC press, Jan. 31, 2011, 2 pages.
(Continued)

*Primary Examiner* — Suresh Suryawanshi
(74) *Attorney, Agent, or Firm* — Compass IP Law PC

(57) ABSTRACT

Examples described herein relate to controlling power available to processes and hardware devices to control a monetary cost of utilized electricity and/or amount of energy utilized from non-renewable energy sources. The system can modify operating configurations of processes and/or hardware based on the available power. The system can control total power drawn to control a monetary cost of power and/or avoid drawing power from non-renewable sources (e.g., fossil fuel sources or grid including gas or coal-based energy sources).

20 Claims, 7 Drawing Sheets

(56) References Cited

OTHER PUBLICATIONS

Muhtaroglu, Ali, Alex Yokochi, and Annette Von Jouanne. "A sustainable power architecture for mobile computing systems.", Elsevier, ScienceDirect Journal of power sources 178, No. 1 (2008): 467-475, Sep. 19, 2007, 9 pages.

Nourian, Pirouz, Ken Arroyo Ohori, and Carlos Martinez-Ortiz. "Essential Means for Urban Computing: Specification of Web-Based Computing Platforms for Urban Planning, a Hitchhiker's Guide.", SSOAR, Opent Access Repository, Urban Planning 3, No. 1 (2018): 47-57, published Mar. 29, 2018, 12 pages.

\* cited by examiner

PLATFORM CONFIGURATION BASED ON AVAILABILITY OF SUSTAINABLE ENERGY

BACKGROUND

Computing centers such as data centers consume large amounts of electricity from various sources. Considerations in power utilization by a computing center can include cost and renewable energy sources. The cost of electricity can be based on the time of the day and overall demand for electricity. Zero net energy provides for total energy use that is less than or equal to the total energy utilized from renewable energy sources. For example, heat emitted from devices in a data center can be used to generate steam, which in turn can generate electricity and provide renewable energy sources.

DETAILED DESCRIPTION

Figure 1:
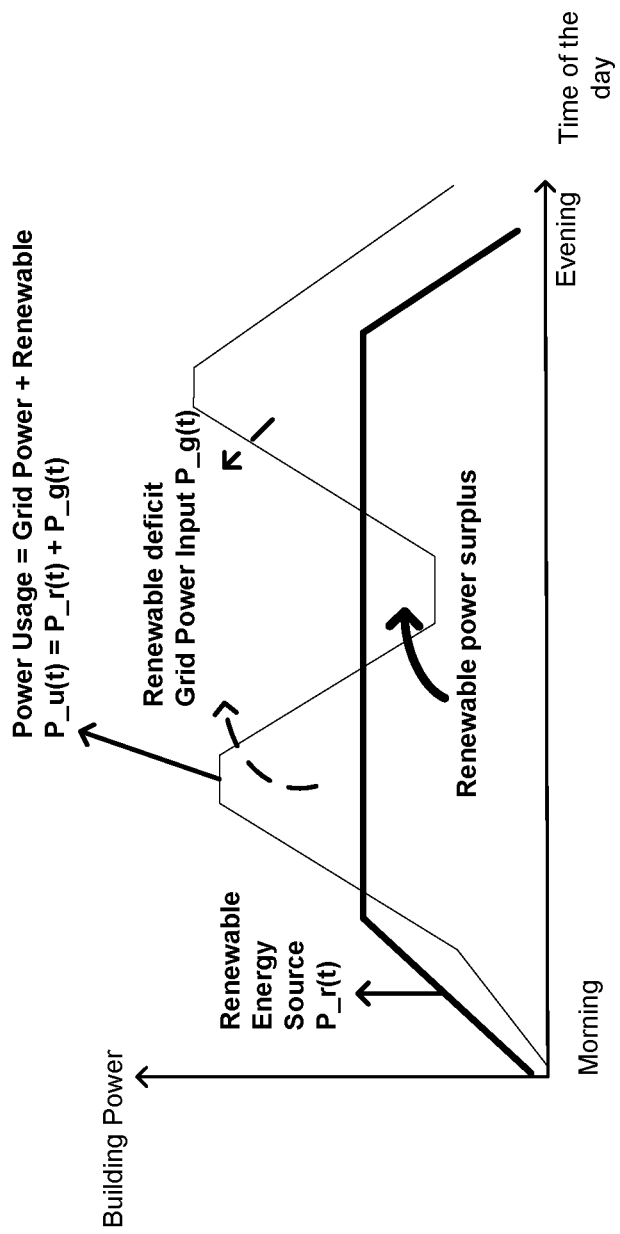
FIG. 1 depicts an example of power consumption.

FIG. 1 depicts an overview of energy utilization from renewable energy sources and grid power. Instantaneous power usage of a system can be represented as a sum of power from renewable energy sources and grid power=$P\_u(t)=P))\_r(t)+P\_g(t)$. As shown, at various times of day, there can be a deficit or surplus of power from renewable sources. Renewable energy sources may not provide a constant source of power, and hence the deficits in supplied power can be offset by a public electric grid. For a sustainable energy building, electrical usage may avoid power usage from a grid to achieve carbon neutrality and energy neutrality, whereby total power produced by a building≥Total Power Usage of a building. However, where utilized power exceeds power from renewable energy sources (e.g., a facility uses more energy than it generates), carbon-neutrality or energy neutrality are not achieved.

A system can control power available to processes and hardware devices to control a monetary cost of utilized electricity and/or amount of energy utilized from non-renewable energy sources. The system can modify operating configurations of processes and/or hardware based on the available power. The system can control total power drawn to control a monetary cost of power and/or avoid drawing power from non-renewable sources (e.g., fossil fuel sources or grid including gas or coal-based energy sources). The system can be configured to purchase carbon credits on behalf of a client. As workloads on the computing platform are dynamic in nature, learning agents can monitor and learn operating configurations of hardware, operating system (OS), hypervisor, or applications that achieve various performance goals including total power utilization or renewable power utilization. Based on recommendations from learning agents, the system can dynamically adjust operating configurations of one or more of hardware, operating system (OS), hypervisor, or applications. The learning agents or other circuitry can adapt operating configurations of one or more of hardware, OS, hypervisor, or applications based on performance configurations, including permitted power utilization. Applications may defer workloads that are not time-sensitive until more renewable energy is availability or costs of energy are within a configured range. The system can control total monetary cost of power utilized and attempt to achieve carbon-neutrality and energy-neutrality.

Figure 2A:
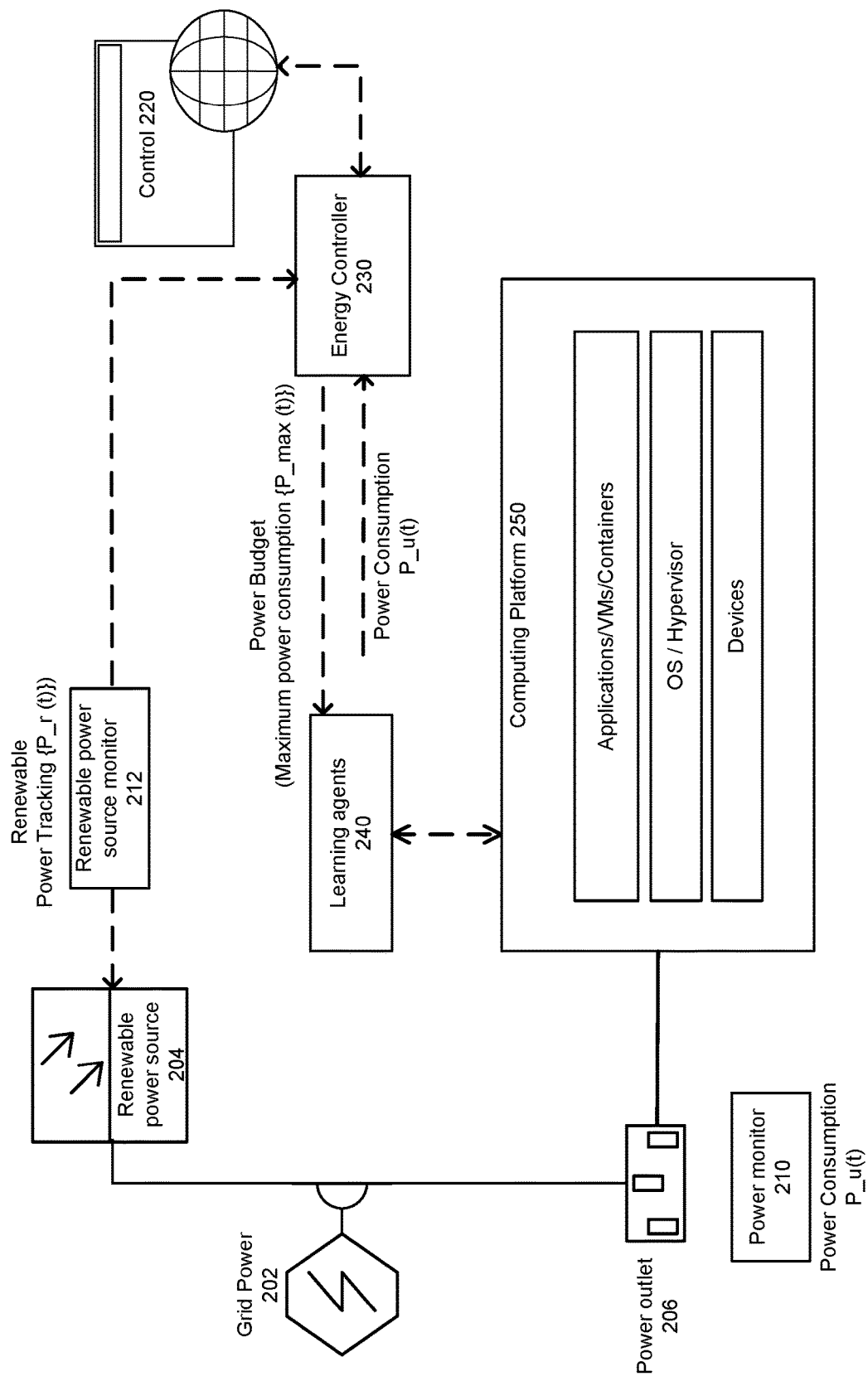
FIG. 2A depicts an example system.

FIG. 2A depicts an example system. The system can control total power utilization from renewable and non-renewable energy sources received via one or more power outlets by one or more processes and one or more devices. The system can modify operating configurations of one or more processes and one or more devices based on available power.

One or more power outlets can provide power from one or more of grid power 202 and renewable power sources 204. Examples of grid power 202 include power generated from fossil fuel-based energy such as coal, gasoline, or oil. Examples of renewable power sources include: solar, turbine, wind-powered turbine, tidal, hydroelectric, geothermal, or biomass. Power monitor 210 can monitor power provided from power outlet 206 to computing platform 250 by one or more of gride power 202 and/or renewable power source 204. Renewable power source monitor 212 can monitor power supplied by renewable power source 204.

Controller 220 can configure time-based power budgets (e.g., maximum power consumption from grid and/or renewable sources) by one or more of: data centers, edge network elements, central offices, enterprise offices, university buildings, smart homes, and so forth. Energy controller 230 can provide a maximum power consumption budget (e.g., P_max(t)) to set an upper limit on power consumption for a time or time range (e.g., 9 AM to 11 AM, 11 AM to 3 PM, and so forth). Configuration of power budgets that are based on time can control monetary costs of power consumption by computing platform 250.

For orchestrator and cloud native deployments, controller 220 can assist with the management of processes, OS, hypervisors, or devices in multiple platforms. Cloud analytic management and larger learning and adaptation at larger scale can occur based on learning from similar processes, OS, hypervisors, or devices on other platforms in the same or other data centers to indicate accepted or rejected operating parameters for particular operating goals and power goals. A datacenter administrator can manage operations of one or more platforms using cloud analytics.

Computing platform 250 can include one or more devices that execute or are utilized by one or more processes. One or more processes can include one or more of: operating system (OS), hypervisor, applications, virtual machines (VMs), or containers. One or more devices can include one or more of: central processing units (CPUs), graphics processing units (GPUs), accelerators, network interface devices, or device interfaces. Reference to a process can refer to one or more of: a virtual machine (VM), application, container, microservice, thread, or function. Reference to a VM, application, container, microservice, thread, function, or process can refer to another one or more of: VM, application, container, microservice, thread, function, or process. A hypervisor (e.g., virtual machine monitor (VMM) can create and manage execution of virtual machines (VMs) using shared resources (e.g., memory, processor, network interface, accelerator, and so forth).

Learning agents 240 can adjust process and hardware operation settings based on renewable power supplied to computing platform 250 ($P\_r(t)$) to meet or exceed a time-based goal of renewable power consumption. In addition, or alternatively, learning agents 240 can adjust process and hardware settings based on available total power (P_u(t)) to be no more than permitted power usage (P_max(t)) for a particular time.

Learning agents 240 can profile operating characteristics or settings of processes, OS, hypervisor, and devices (e.g., CPU load, memory footprint, I/O transactions, and others described herein) and operating goals (e.g., maximum available power, application priorities, task deadlines, and others described herein). Learning agents 240 can estimate operating parameters of processes, OS, hypervisor, and/or platform hardware component(s) based on feedback to learning models through reinforcement functions. Learning agents 240 can adjust operating settings to achieve operating goals including service level agreement (SLA) parameters (e.g., time to completion of a workload) and power usage parameters. Learning agents 240 can be allocated per process, per OS, per hypervisor, and/or per device, in some examples.

Learning agents 240 can adjust settings by one or more of: adjust sleep state of a processor, increase processor frequency, decrease processor frequency, increase supplied voltage, decrease supplied voltage, increase memory utilization, decrease memory utilization, changing the OS characteristics to operate in reduced or increased available memory, increase input/output (I/O) utilization, decrease input/output (I/O) utilization, perform critical processes (based on the user priority), or causing a process to sleep or wake. For example, Dynamic Voltage and Frequency Scaling (DVFS) and other technologies (e.g., Intel's Speed Select Base Frequency (BF)) can be used to control operation settings by adjusting voltage and/or operating frequency of devices. The task scheduler in OS or hypervisor can defer execution of a workload based on non-availability of power to perform the workload. Applications may opt to defer jobs that are not time-sensitive until more renewable energy is availability.

In some cases, if a power utilization level (P_max) is not sufficient for processes executing on platform 250 to achieve performance goals (e.g., SLA parameters), an option can be utilized to violate the SLA or performance goals to meet the power target or energy controller 230 and learning agents 240 can be configured such that performance takes precedence over power and power utilization can exceed P_max (t) in order to meet SLA or performance goals for processes.

Learning agents 240 can provide recommended operating setting to a process, OS, hypervisor, or device. The process, OS, hypervisor, or device can include or utilize an application program interface (API) to accept or reject configurations provided by learning agents 240 based on hardware configurations, restrictions, and user priorities. A configuration from learning agents 240 can be accepted (applied) or rejected (not applied) and feedback provided of acceptance or rejection to learning agents 240. Acceptance can reinforce a recommended setting by learning agents 240, whereas a rejection can cause learning agents 240 can change a configuration parameter that is adjusted in a next recommended setting.

Power monitor 210 can monitor power consumption from a power outlet or source, and send the power consumption as telemetry data to learning agents 240 and/or control 220.

Learning agents 240 and/or energy controller 230 can be implemented as one or more of processor-executed software, field programmable gate arrays (FPGAs), application specific integrated circuits (ASICs), circuits, and so forth. Learning agents 240 can be implemented as a software service part of an OS or hypervisor. Learning agents 240 can be performed on an edge compute node. Learning agents 240 can be coupled to devices in computing platform using a device interface such as Peripheral Component Interconnect express (PCIe) or Compute Express Link (CXL).

A data center or orchestrator can offer renewable energy credits for use by processes to be executed on behalf of a client based on availability of renewable energy. Operating configurations of one or more processes and one or more devices can be based, at least in part, on availability of renewable energy credits, among other factors. Renewable energy credits can include carbon offsets or carbon credits. Availability of renewable energy credits can include purchases of renewable energy credits on behalf of a client.

Figure 2B:
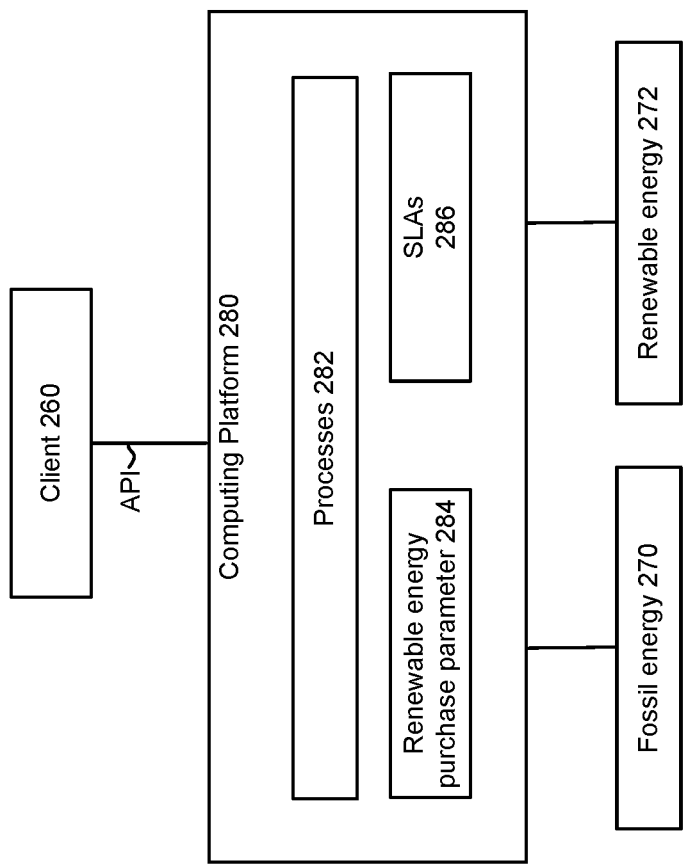
FIG. 2B depicts an example system.

FIG. 2B depicts an example system. Computing platform 280 of a data center can execute processes using processors and devices powered by fossil energy 270 and/or renewable energy 272. Client 260 can utilize an API to specify SLA 286 for one or more processes 282 to be executed by computing platform 280. SLA 286 for one or more processes 282 can specify one or more of: whether renewable energy is to be used by computing platform 280 to perform one or more of processes 282, whether renewable energy need not be used by computing platform 280 to perform one or more of processes 282, whether renewable energy credits are to be purchased if insufficient renewable energy is available to computing platform 280 to perform one or more of processes 282, or an extent of renewable energy credits to be purchased 284 (e.g., number of credits or monetary amount) if insufficient renewable energy is available to computing platform 280 to perform one or more of processes 282.

SLA 286 for one or more processes 282 can specify one or more of: indicate performance degradation of a process is not permitted if not enough renewable energy from renewable energy 272 is available for use by computing platform 280 or one or more of processes 282 or permit performance degradation of one or more of processes 282 and extent of performance degradation (e.g., percentage or performance levels) if not enough renewable energy from renewable energy 272 is available for use by computing platform 280 or process 282. SLA 286 can specify priority level of the process and/or renewable energy usage and an orchestrator or data center can prioritize use of renewable energy for processes associated with higher priority quality of service or higher priority level of renewable energy usage.

For example, if SLA 286 specifies to execute a process without consideration of use of renewable energy, computing platform 280 (e.g., server) can execute the process using fossil fuel energy 270 and utilize renewable energy 272, if renewable energy is available. Where another an SLA for another process indicates use of renewable energy, a datacenter may allocate available renewable energy for use by processes associated with an indication to use renewable energy and allocate fossil fuel for use by processes associated with an indication that renewable energy need not be used or is not to be used. Where an SLA for a process indicates a specified number of carbon offsets or monetary amount of carbon offsets can be purchased, in the event that renewable energy is not available for the process, carbon offsets can be purchased and used to power execution of the process. If indicated by the SLA, where insufficient renewable energy is available and carbon credits are not available for purchase, the process can experience degraded performance from reduced available power.

In some examples, a data center can execute an aggregate group of processes, of different or same clients, with similar renewable energy and carbon usage profiles on particular servers and hardware resources.

Figure 3:
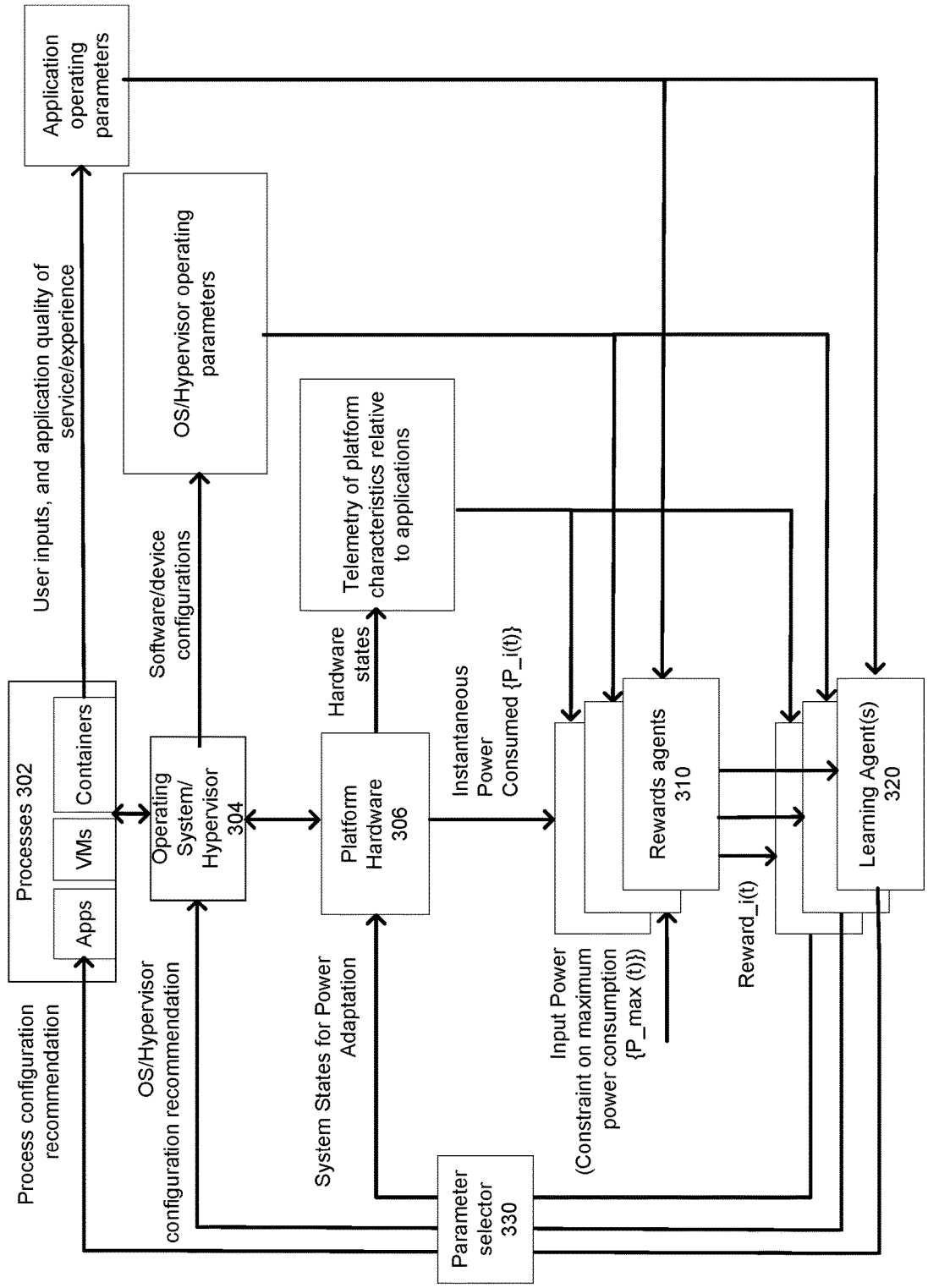
FIG. 3 depicts an example system.

FIG. 3 depicts an example operation of a system to configure execution of workloads. Learning agents 320 can provide recommendations of operating parameters of one or more of: processes 302; operating system or hypervisor 304; and/or platform hardware 306. Based on acceptance or rejection of the provided recommendations, and feedback from rewards agents 310, learning agents 320 can adjust recommended operating parameters, as described herein. Settings of processes 302, OS/HV 304, and hardware 306 can be adjusted independently to attempt meet goals of power utilization and performance goals.

Parameter selector 330 can receive recommendations from one or more learning agents 320 and select which parameter to submit for controlling the power characteristics of the platform to achieve a power consumption goal. For example, recommendations can be sent to processes 302 and if processes 302 accept the recommendations or the platform power characteristics is not achieved, parameter selector 330 can provide OS/hypervisor (HV) 304 recommendations from learning agents 320. Similarly, if applied recommendations to OS/HV 304 were not sufficient to achieve the power goals for the platform, platform recommendations from learning agents 320 can be provided to the platform hardware 306.

Processes 302 have performance characteristics to meet their service deadlines and operating parameters defined by associated service level agreements (SLAs). Processes 302 can define a set of power dependent variables and expose them to learning agent 320 through application program interfaces (APIs) during application instantiation or registration with a learning agent. For example, a process can provide input options {e.g., var 1, var 2, . . . var N_input}, and recommendation options {var 1, var 2, . . . var N_recommendations} to its associated learning agent. Examples of parameters include one or more of: termination strategies, accelerator scheduling, offloading of execution to cloud or edge, deadline tolerance, or others.

For example, a process can register a resolution of input data or polling rate to be adjusted by the learning agent. For example, a process can register a configuration of a video processing application as a resolution of input data. For example, a process can register a configuration of a packet processing application as a polling rate for polling for received packets by a network interface controller (NIC). Process can indicate operating parameters to learning agents 320 and rewards agents 310 such as latency, deadline miss, and so forth in order to use the configurations to adjust parameters based on power usage. User preferences can configure rewards agents to prioritize applications and degrees of freedom to choose power saving techniques.

Based on provided operating parameters from a learning agent, a process can accept the recommendation (e.g., output value of 1), ignore the recommendation (e.g., output value of 0), or rejects recommendation (e.g., output value of −1) with notification to the learning agent. If a recommendation is accepted, the reward agent for the learning agent can determine the outcome by observing the power consumption and/or process performance to validate if the recommendation was in the right direction or further correction is to take place. If an operating recommendation is ignored, the associated parameter can be left out from adjustment by the learning agent. If a recommendation is rejected, a reward agent associated with the learning agent can adjust the recommendation value in a different direction or change a parameter that is adjusted. For example, a negative reward (e.g., rejected recommendation) while decreasing the CPU frequency could result in rolling back of CPU changes, and applying an alternative such as stopping certain cores within a given CPU to achieve the power goals.

In some cases, whether a recommendation is accepted, ignored, or rejected can be based on whether a recommended configuration would cause the process, OS/HV, and/or device to enter a valid or invalid state. A recommendation can be accepted if application of the configuration would lead to a valid state, whereas a recommendation can be ignored or rejected if application of the configuration would lead to an invalid state Rewards agents 310 can receive input power (e.g., maximum power consumption {P_max (t)}) and instantaneous power consumption {P_i(t)} in order to evaluate the difference between observed and expected power, such that the recommendations can be adjusted to achieve the power consumption goals and process performance goals.

OS/HV 304 can register, with learning agents 20, system states for configuration such as one or more of: kernel (system) calls, OS task scheduling (e.g., selection of core to execute a process, suspending process execution, terminating process execution), memory swapping (e.g., moving data from memory to storage (or persistent memory), and vice versa), I/O usage, task scheduling, memory management strategies, application scheduling, virtualization strategies, file-system management, and/or other services. Parameter selector 330 can provide OS/HV recommendations from learning agent to OS/HV 304 to apply. For instance, to control power consumption, task scheduling can adjust a frequency at which the processes are scheduled on CPUs. For example, an OS can change from polling to interrupt-driven responses, or vice versa, to meet power consumptions goals. OS/HV 304 can indicate accept, ignore, or reject a recommendation to learning agent and rewards agent. A parameter can be ignored if OS/HV 304 is unable to accept the recommended parameter because of a current system state. For instance, task scheduler can no longer accept the recommended schedule due to collision with other scheduling frequency, or process/application limitations.

Platform hardware 306 can register with learning agents 320 system states for configuration such as one or more of: CPU states (e.g., power consumption), CPU scheduling, memory allocation, I/O bandwidth allocation, dynamic voltage and frequency scaling (DVFS) adjustments, network interface selection, network throttling, hardware acceleration, and so forth.

A component of platform hardware 306 can determine whether to accept, ignore, or reject a configuration recommendation based on hardware configurations, restrictions, operational characteristics, and user preferences. The platform hardware component can provide to rewards agents 310 telemetry of platform characteristics relative to applications such as performance, power consumption, and other parameters. In some examples, if application and OS/HV policies cannot be accommodated based on their relative recommendations, learning agents 320 can adjust platform hardware configurations. For instance, if a task scheduling policy cannot be applied to a particular application which is running on a specific core, an operating frequency of the core can be reduced to that core identifier, when that task is being executed.

Figure 4:
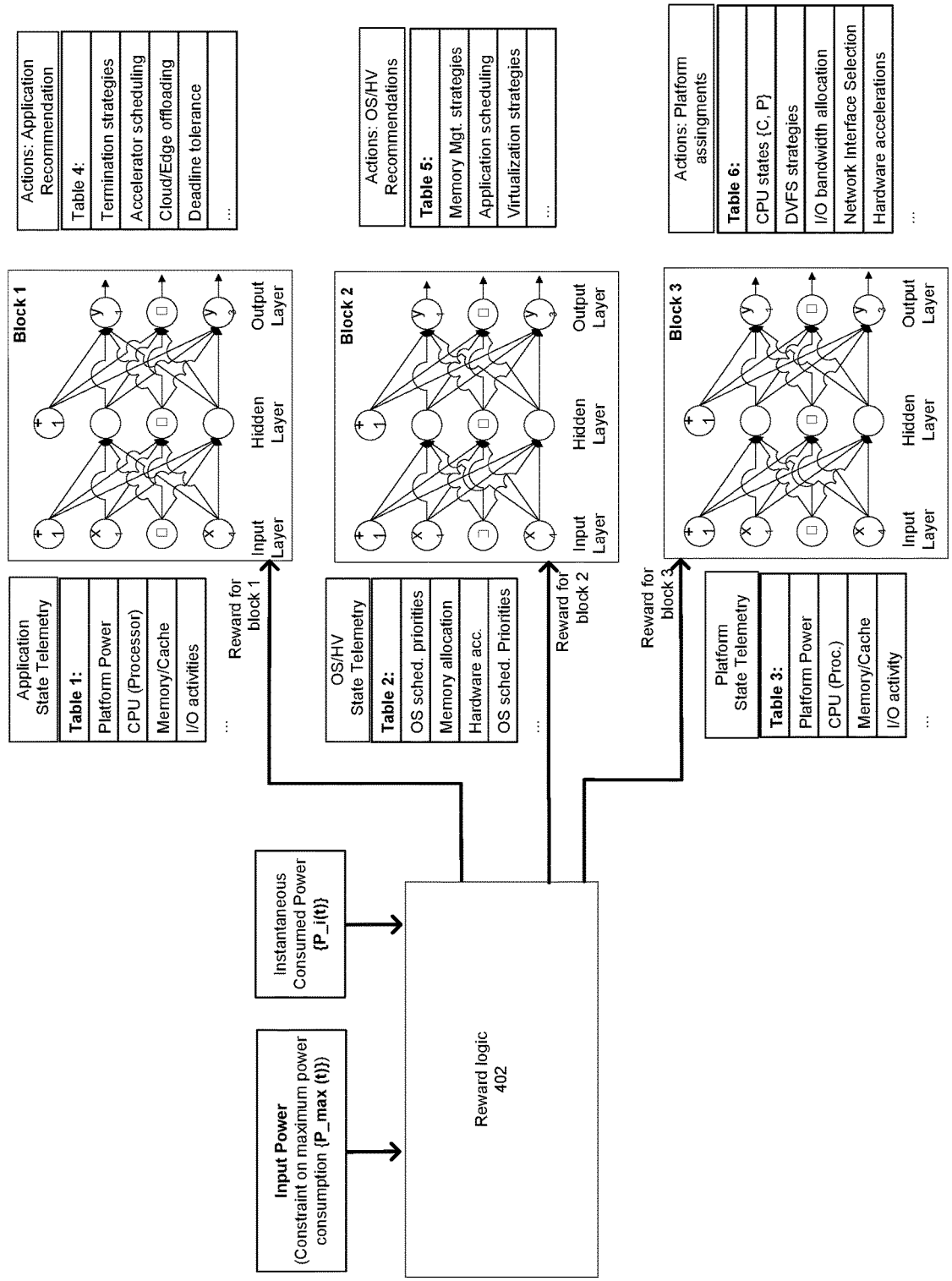
FIG. 4 depicts an example operation.

FIG. 4 depicts an overview learning agents and the reinforcement functions to learn operating configurations for different performance goals and power characteristics. Reward logic 402 can indicate whether a parameter should be considered positively, negatively, or ignored based on a weighting operation. An example weighting operation is as follows:

```
if (Weighted_summation_(a*W1, b*W1, c*W1,...) >
Weighted_summation_(x*M1,y*M1, z*M1,...))
    {Reward_block1 = +ve; Reward_block2 = +ve;}
    else{Reward_block1 = –ve; Reward_block2 = –ve;}
```

For a given configuration setting, if a platform consumes more power than previously, a negative reward can be generated and the configuration is less likely to be recommended by a learning agent. Conversely, if the platform consumes less power than previously, then a positive reward can be generated and the configuration is more likely to be recommended by a learning agent. A positive reward can indicate that a configuration recommended by a learning agent was accepted and learning agents may continue utilizing the recommendation or adjusting the recommendation, until achieving the power goals. Alternatively, a negative reward causes the learning agents to drop the configurations and adjust another setting.

As shown, various machine learning operations can be used to correlate application, OS, hypervisor (HV), or platform telemetry with configuration recommendations, such as values of various configurations. Rewards (positive or negative) can be supplied to neural network blocks 1-3 to adjust values of configuration settings for applications, OS/HV, and devices accessible to the platform.

Figure 5:
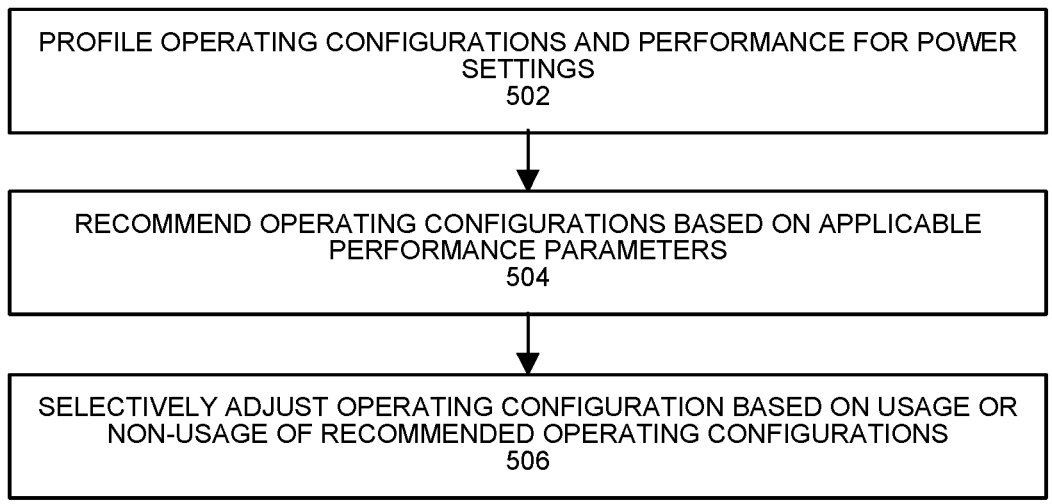
FIG. 5 depicts an example process.

FIG. 5 depicts an example process that can be used to select operating parameters of a system based at least one power utilization parameters. At 502, during a learning phase, a learning agent profiles operating configurations of a process for the power characteristics when running as an isolated entity. For example, total power consumed by the platform due to running of the process can be determined. Operating configurations can include various operating characteristics of processes, OS, hypervisor, or devices described herein. At 504, during an estimation and reinforcement phase, the learning agent can apply operating configurations based on performance parameters, including SLA specifications and power usage parameter, to one or more of: application, OS/HV, and devices. The operating configurations based on performance parameters, including power usage parameter can be based on operating parameters learned or determined during the learning phase.

At 506, during an estimation and reinforcement phase, the learning agent can adjust future recommendation of one or more operating parameters based on whether the operating configuration was accepted or not accepted. For example, if a process, OS, hypervisor, or device utilized one or more recommended operating parameters, the one or more recommended operating parameters can be more likely to be recommended again for particular performance parameters. Monitoring of power consumption provides the relative performance of the learning models, and reinforcement techniques can be applied to reward the positive feedback on the power conservation while meeting the performance demands.

Example scenarios follow. A university has a green and sustainable building designed as "Net Energy Zero" or "Net Zero Energy," which means the total energy consumed is less than or equal to the total energy produced through renewable sources. In this building, there are several computing hardware that operate at full capacity at all times. Using technologies described herein, the computing platforms could be controlled to dynamically reduce or increase computing capacities to match the source power constraints, so that the building total energy demands are within limits to achieve Net Zero Energy.

In another example, the cost of power drawn from an electric grid by a data center depends on the time of the day. If the pricing is allowed to change dynamically based on the total demand of the city, the computing platforms in the data center can utilize technologies described herein to dynamically adapt operating configurations based on changing monetary prices to control monetary costs of operating the data center.

Figure 6:
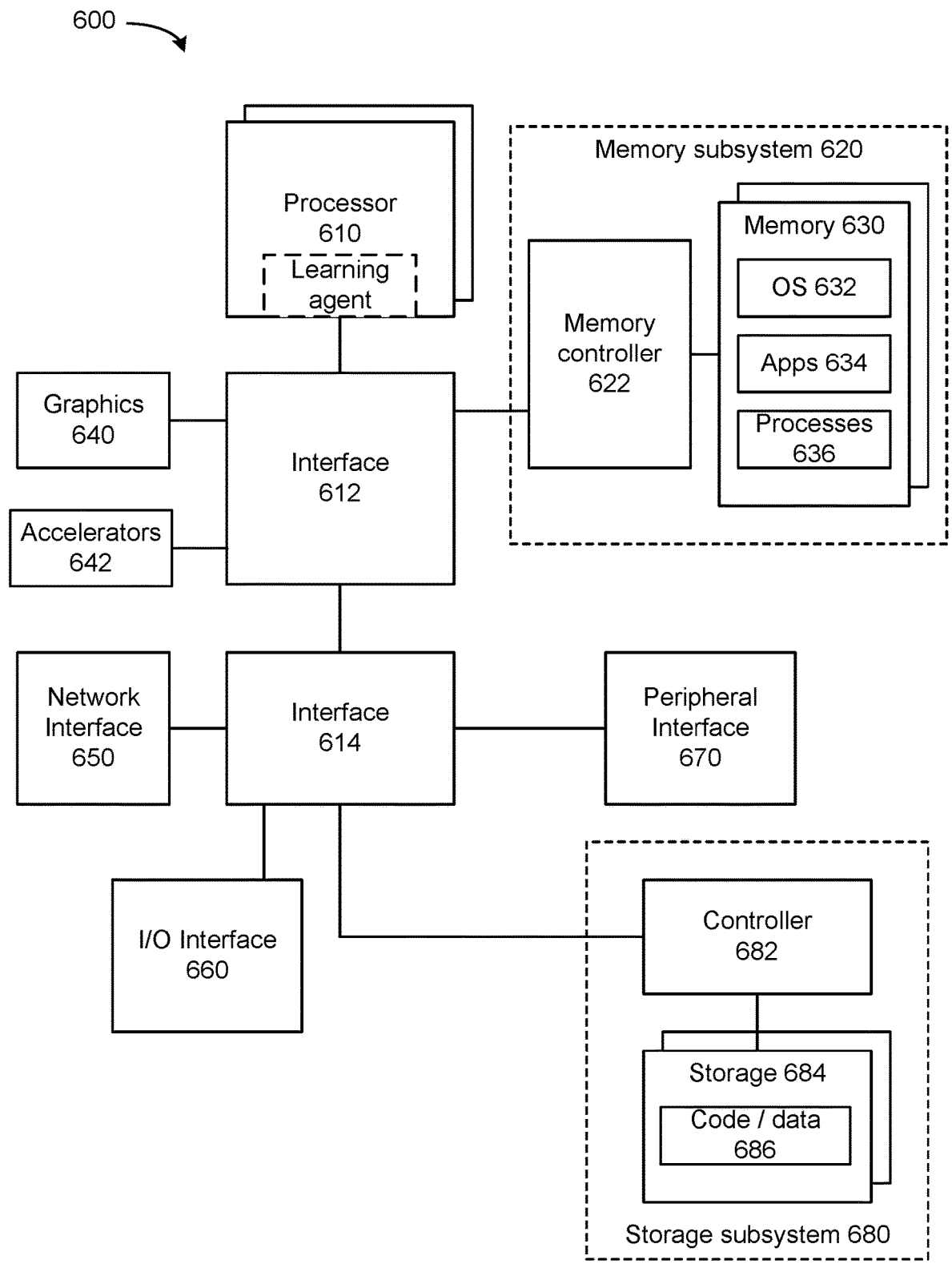
FIG. 6 depicts an example system.

FIG. 6 depicts a system. Components of the system can utilize techniques to control operating parameters of processes and/or devices based on available power, where available power can be based on monetary cost of power and power from renewable sources, as described herein. System 600 includes processor 610, which provides processing, operation management, and execution of instructions for system 600. Processor 610 can include any type of microprocessor, central processing unit (CPU), graphics processing unit (GPU), XPU, processing core, or other processing hardware to provide processing for system 600, or a combination of processors. An XPU can include one or more of: a CPU, a graphics processing unit (GPU), general purpose GPU (GPGPU), and/or other processing units (e.g., accelerators or programmable or fixed function FPGAs). Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a display that provides an output to a user. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models. AI and ML models can be trained to perform inference operations.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

In some examples, OS 632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on one or more processors sold or designed by Intel®, ARM®, AMD®, Qualcomm®, IBM®, Nvidia®, Broadcom®, Texas Instruments®, among others.

Learning agents described herein can execute on processor 610 and/or accelerator 632 to recommend operating configurations, based on performance goals (including power usage), for processes, OS 632, hypervisor, and/or devices (e.g., processor 610, interface 612, interface 614, memory 630, graphics 640, accelerators 642, network interface 650, storage 684, or others).

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes one or more examples, and includes a non-transitory computer-readable medium comprising instructions stored thereon, that if executed by one or more processors, cause the one or more processors to: control operating configurations of one or more processes and one or more devices based, at least in part, on availability of energy from a renewable energy source.

Example 2 includes one or more examples, wherein to control operating configurations of one or more processes and one or more devices based, at least in part, on availability of energy from a renewable energy source is to reduce utilization of power from a fossil fuel source.

Example 3 includes one or more examples, wherein control operating configurations of one or more processes and one or more devices comprises one or more of: adjust processor frequency, adjust supplied voltage, adjust memory utilization, adjust input/output (I/O) utilization, scheduling execution of a process, defer execution of a workload, kernel calls, scheduling of a process on a core, or memory swapping.

Example 4 includes one or more examples, wherein the one or more processes comprise one or more of: operating system (OS), hypervisor, applications, virtual machines (VMs), containers, microservices, or functions.

Example 5 includes one or more examples, wherein the one or more devices comprise one or more of: central processing unit (CPU), graphics processing unit (GPU), accelerator, network interface device, or device interface.

Example 6 includes one or more examples, wherein the control operating configurations of one or more processes and one or more devices based, at least in part, on availability of energy from a renewable energy source is also based, at least in part, on monetary cost of energy.

Example 7 includes one or more examples, wherein the control operating configurations of one or more processes and one or more devices based, at least in part, on availability of energy from a renewable energy source is also based, at least in part, on purchases of renewable energy credits.

Example 8 includes one or more examples, and includes an apparatus comprising: circuitry to control operating configurations of one or more processes and one or more devices based, at least in part, on availability of energy from a renewable energy source and a device interface to provide communicative coupling to the circuitry.

Example 9 includes one or more examples, wherein to control operating configurations of one or more processes and one or more devices based, at least in part, on availability of energy from a renewable energy source is to reduce utilization of power from a fossil fuel source.

Example 10 includes one or more examples, wherein control operating configurations of one or more processes and one or more devices comprises one or more of: adjust processor frequency, adjust supplied voltage, adjust memory utilization, adjust input/output (I/O) utilization, scheduling execution of a process, defer execution of a workload, kernel calls, scheduling of a process on a core, or memory swapping.

Example 11 includes one or more examples, wherein the one or more processes comprise one or more of: operating system (OS), hypervisor, applications, virtual machines (VMs), containers, microservices, or functions.

Example 12 includes one or more examples, wherein the one or more devices comprise one or more of: central processing unit (CPU), graphics processing unit (GPU), accelerator, network interface device, or device interface.

Example 13 includes one or more examples, wherein the control operating configurations of one or more processes and one or more devices based, at least in part, on availability of energy from a renewable energy source is also based, at least in part, on monetary cost of energy.

Example 14 includes one or more examples, wherein the control operating configurations of one or more processes and one or more devices based, at least in part, on availability of energy from a renewable energy source is also based, at least in part, on purchases of renewable energy credits.

Example 15 includes one or more examples, and includes at least one processor communicatively coupled to the device interface.

Example 16 includes one or more examples, and incudes a server that includes the at least one processor, the circuitry, and the device interface, wherein the server is configured to utilize the circuitry to control operating configurations of one or more processes and one or more devices based, at least in part, on availability of energy from a renewable energy source and/or based, at least in part, on monetary cost of energy.

Example 17 includes one or more examples, and includes a data center that comprises the server, wherein the data center is configured to utilize the circuitry to control operating configurations of one or more processes and one or more devices based, at least in part, on availability of energy from a renewable energy source and/or based, at least in part, on monetary cost of energy.

Example 18 includes one or more examples, and includes a method comprising: controlling operating configurations of one or more processes and one or more devices based, at least in part, on availability of energy from a renewable energy source.

Example 19 includes one or more examples, wherein controlling operating configurations of one or more processes and one or more devices comprises one or more of: adjust processor frequency, adjust supplied voltage, adjust memory utilization, adjust input/output (I/O) utilization, scheduling execution of a process, defer execution of a workload, kernel calls, scheduling of a process on a core, or memory swapping.

Example 20 includes one or more examples, wherein the one or more processes comprise one or more of: operating system (OS), hypervisor, applications, virtual machines (VMs), containers, microservices, or functions and the one or more devices comprise one or more of: central processing unit (CPU), graphics processing unit (GPU), accelerator, network interface device, or device interface.

What is claimed is:

1. At least one non-transitory computer-readable medium comprising instructions stored thereon, that if executed by one or more processors, cause the one or more processors to:
   control operating configurations of one or more processes and one or more devices based, at least in part, on availability of energy from a renewable energy source, wherein the control operating configurations of the one or more processes and the one or more devices comprises selecting a renewable energy source for the one or more devices over a fossil fuel source based on availability of renewable energy and selecting the fossil fuel source for the one or more devices based on unavailability of renewable energy.

2. The computer-readable medium of claim 1, wherein to control operating configurations of one or more processes and the one or more devices based, at least in part, on availability of energy from a renewable energy source is to reduce utilization of power from a fossil fuel source.

3. The computer-readable medium of claim 1, wherein control operating configurations of one or more processes and one or more devices comprises one or more of: adjust processor frequency, adjust supplied voltage, adjust memory utilization, adjust input/output (I/O) utilization, scheduling execution of a process, defer execution of a workload, kernel calls, scheduling of a process on a core, or memory swapping.

4. The computer-readable medium of claim 1, wherein the one or more processes comprise one or more of: operating system (OS), hypervisor, applications, virtual machines (VMs), containers, microservices, or functions.

5. The computer-readable medium of claim 1, wherein the one or more devices comprise one or more of: central processing unit (CPU), graphics processing unit (GPU), accelerator, network interface device, or device interface.

6. The computer-readable medium of claim 1, wherein the control operating configurations of one or more processes and one or more devices based, at least in part, on availability of energy from a renewable energy source is also based, at least in part, on monetary cost of energy.

7. The computer-readable medium of claim 1, wherein the control operating configurations of one or more processes and one or more devices based, at least in part, on availability of energy from a renewable energy source is also based, at least in part, on purchases of renewable energy credits.

8. An apparatus comprising:
   circuitry to control operating configurations of one or more processes and one or more devices based, at least in part, on availability of energy from a renewable energy source, wherein the control operating configurations of the one or more processes and the one or more devices comprises selecting a renewable energy source for the one or more devices over a fossil fuel source based on availability of renewable energy and selecting the fossil fuel source for the one or more devices based on unavailability of renewable energy and
   a device interface to provide communicative coupling to the circuitry.

9. The apparatus of claim 8, wherein the control operating configurations of one or more processes and the one or more devices based, at least in part, on availability of energy from the renewable energy source is to reduce utilization of power from a fossil fuel source.

10. The apparatus of claim 8, wherein the control operating configurations of one or more processes and one or more devices comprises one or more of: adjust processor frequency, adjust supplied voltage, adjust memory utilization, adjust input/output (I/O) utilization, scheduling execution of a process, defer execution of a workload, kernel calls, scheduling of a process on a core, or memory swapping.

11. The apparatus of claim 8, wherein the one or more processes comprise one or more of: operating system (OS), hypervisor, applications, virtual machines (VMs), containers, microservices, or functions.

12. The apparatus of claim 8, wherein the one or more devices comprise one or more of: central processing unit (CPU), graphics processing unit (GPU), accelerator, network interface device, or device interface.

13. The apparatus of claim 8, wherein the control operating configurations of one or more processes and one or more devices based, at least in part, on availability of energy from a renewable energy source is also based, at least in part, on monetary cost of energy.

14. The apparatus of claim 8, wherein the control operating configurations of one or more processes and one or more devices based, at least in part, on availability of energy from a renewable energy source is also based, at least in part, on purchases of renewable energy credits.

15. The apparatus of claim 8, comprising at least one processor communicatively coupled to the device interface.

16. The apparatus of claim 15, comprising a server that includes the at least one processor, the circuitry, and the device interface, wherein the server is configured to utilize the circuitry to control operating configurations of one or more processes and one or more devices based, at least in part, on availability of energy from the renewable energy source and/or based, at least in part, on monetary cost of energy.

17. The apparatus of claim 16, comprising a data center that comprises the server, wherein the data center is configured to utilize the circuitry to control operating configurations of one or more processes and one or more devices based, at least in part, on availability of energy from the renewable energy source and/or based, at least in part, on monetary cost of energy.

18. A method comprising:
controlling operating configurations of one or more processes and one or more devices based, at least in part, on availability of energy from a renewable energy source, wherein the controlling operating configurations of the one or more processes and the one or more devices comprises selecting a renewable energy source for the one or more devices over a fossil fuel source based on availability of renewable energy and selecting the fossil fuel source for the one or more devices based on unavailability of renewable energy.

19. The method of claim 18, wherein controlling operating configurations of one or more processes and the one or more devices comprises one or more of: adjust processor frequency, adjust supplied voltage, adjust memory utilization, adjust input/output (I/O) utilization, scheduling execution of a process, defer execution of a workload, kernel calls, scheduling of a process on a core, or memory swapping.

20. The method of claim 18, wherein the one or more processes comprise one or more of: operating system (OS), hypervisor, applications, virtual machines (VMs), containers, microservices, or functions and the one or more devices comprise one or more of: central processing unit (CPU), graphics processing unit (GPU), accelerator, network interface device, or device interface.

* * * * *